United States Patent
Dantu et al.

(10) Patent No.: US 10,346,816 B2
(45) Date of Patent: Jul. 9, 2019

(54) SYSTEMS AND METHODS FOR AGGREGATING CONSUMER-SPECIFIC TRANSACTIONS ASSOCIATED WITH A SOCIAL VENTURE

(71) Applicant: MASTERCARD INTERNATIONAL INCORPORATED, Purchase, NY (US)

(72) Inventors: Stephen Dantu, New Hampstead, NY (US); Pablo Cohan, Weston, CT (US); David Laskin, New York, NY (US); Thomas Rempe, Islip, NY (US); Lauren Stephens, Darien, CT (US); John R. Caughey, Mamaroneck, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 814 days.

(21) Appl. No.: 14/532,481

(22) Filed: Nov. 4, 2014

(65) Prior Publication Data

US 2016/0012398 A1 Jan. 14, 2016

Related U.S. Application Data

(60) Provisional application No. 62/023,301, filed on Jul. 11, 2014.

(51) Int. Cl.
*G06Q 20/08* (2012.01)
*G06Q 20/40* (2012.01)
(Continued)

(52) U.S. Cl.
CPC ......... *G06Q 20/0855* (2013.01); *G06Q 20/12* (2013.01); *G06Q 20/40* (2013.01); *G06Q 50/01* (2013.01)

(58) Field of Classification Search
None
See application file for complete search history.

(56) References Cited

U.S. PATENT DOCUMENTS

| 8,504,428 B1* | 8/2013 | Houghtaling | G06Q 20/12 |
| | | | 705/16 |
| 2004/0167851 A1* | 8/2004 | Knowles | G06Q 20/00 |
| | | | 705/39 |

(Continued)

FOREIGN PATENT DOCUMENTS

WO    WO2006/004794    *  1/2006    ............. G06Q 99/00

OTHER PUBLICATIONS

"The VISA Payment Facilitator Model—A Framework for Merchant Aggregation" dated May 2, 2014 in the Google archives at https://usa.visa.com/dam/VCOM/download/merchants/02-MAY-2014-Visa-Payment-FacilitatorModel.pdf (Year: 2014).*

(Continued)

*Primary Examiner* — Alexander G Kalinowski
*Assistant Examiner* — Blane A Lickteig
(74) *Attorney, Agent, or Firm* — Harness, Dickey & Pierce, PLC

(57) ABSTRACT

Exemplary systems and methods for aggregating consumer-specific transactions made to member merchants associated with a social venture are disclosed. One exemplary method includes distributing a merchant computing device to each of multiple member merchants associated with a social venture and capturing and storing, in memory, multiple transactions from the merchant computing devices, during a social venture period. At least two of the multiple transactions involve a consumer account. The exemplary method further includes aggregating the at least two transactions to the consumer account into a single transaction and submitting the single transaction to an acquirer to be settled.

17 Claims, 3 Drawing Sheets

(51) Int. Cl.
*G06Q 20/12* (2012.01)
*G06Q 50/00* (2012.01)

(56) References Cited

U.S. PATENT DOCUMENTS

| | | | | |
|---|---|---|---|---|
| 2006/0149671 A1* | 7/2006 | Nix | G06Q 20/04 | 705/40 |
| 2007/0063024 A1* | 3/2007 | Guillot | G06Q 20/20 | 235/380 |
| 2010/0274719 A1* | 10/2010 | Fordyce, III | G06Q 20/22 | 705/44 |
| 2013/0262307 A1* | 10/2013 | Fasoli | G06Q 20/24 | 705/44 |
| 2013/0311375 A1* | 11/2013 | Priebatsch | G06Q 30/06 | 705/44 |
| 2014/0172680 A1* | 6/2014 | Prabhu | G06Q 40/025 | 705/38 |
| 2017/0109746 A1* | 4/2017 | Mohandas | G06Q 20/102 | |

OTHER PUBLICATIONS

VISA Payment Facilitator Model, May 2, 2014.*

* cited by examiner

SYSTEMS AND METHODS FOR AGGREGATING CONSUMER-SPECIFIC TRANSACTIONS ASSOCIATED WITH A SOCIAL VENTURE

CROSS-REFERENCE TO RELATED APPLICATION

This application claims the benefit of U.S. Provisional Application No. 62/023,301 filed on Jul. 11, 2014. The entire disclosure of the above application is incorporated herein by reference.

FIELD

The present disclosure relates to systems and methods for aggregating consumer-specific transactions with member merchants associated with a social venture.

BACKGROUND

This section provides background information related to the present disclosure which is not necessarily prior art.

Card accounts are known to be used to purchase a variety of different goods and services from merchants. Certain merchants, especially larger merchants with brick-and-mortar locations, or virtual locations on the Internet, permit consumers to complete transactions through card accounts for the convenience of the consumers. The merchants are charged fees for purchases made to the card accounts. The fees are shared among the issuer of the card account, a payment service provider, and the acquirer associated with the merchant. The impact of the fees to the merchants often depends on volume and/or value of transactions made to the card accounts. Separately, social ventures, such as festivals, farmers' markets, sports events, school activities, carnivals, etc., exist where groups of merchants gather, often temporarily, to offer goods and/or services to consumers. Transactions with merchants in the social venture are generally reliant on cash or check to avoid fees associated with card accounts, especially for low volume and low value transactions. Certain merchants do arrange to receive payments through card accounts utilizing devices, such as Square®, by which each merchant is setup with an individual account and is then charged a certain fee (e.g., 3.0%) for each transaction made to a card account.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Social ventures can involve merchants offering goods and/or services for purchase to attendees of the social ventures. Merchants to the social ventures, i.e., member merchants, often accept cash or check, as a means of payment for such goods and/or services. Methods and systems described herein enable use of payment accounts to complete transactions at the social ventures, by aggregating the transactions with member merchants at an organizer before sending the transactions for settlement. In particular, each payment account transaction to a member merchant during a social venture period is made through one organizer account. Where multiple transactions are directed to a consumer's payment account, the multiple transactions are aggregated into a single transaction. This single transaction is then settled through the payment network after the social venture. The organizer, in turn, remits payment to each of the member merchants. In this manner, multiple transactions (per consumer account) are reduced to a single transaction, and a single fee associated with the transactions. And, the fee is spread over each of the member merchants, at the social venture, who completed transactions with the consumer. The reduced transactions, and resulting reduced fees, permit organizers of social ventures to facilitate convenient payment account transactions for its member merchants.

Figure 1:
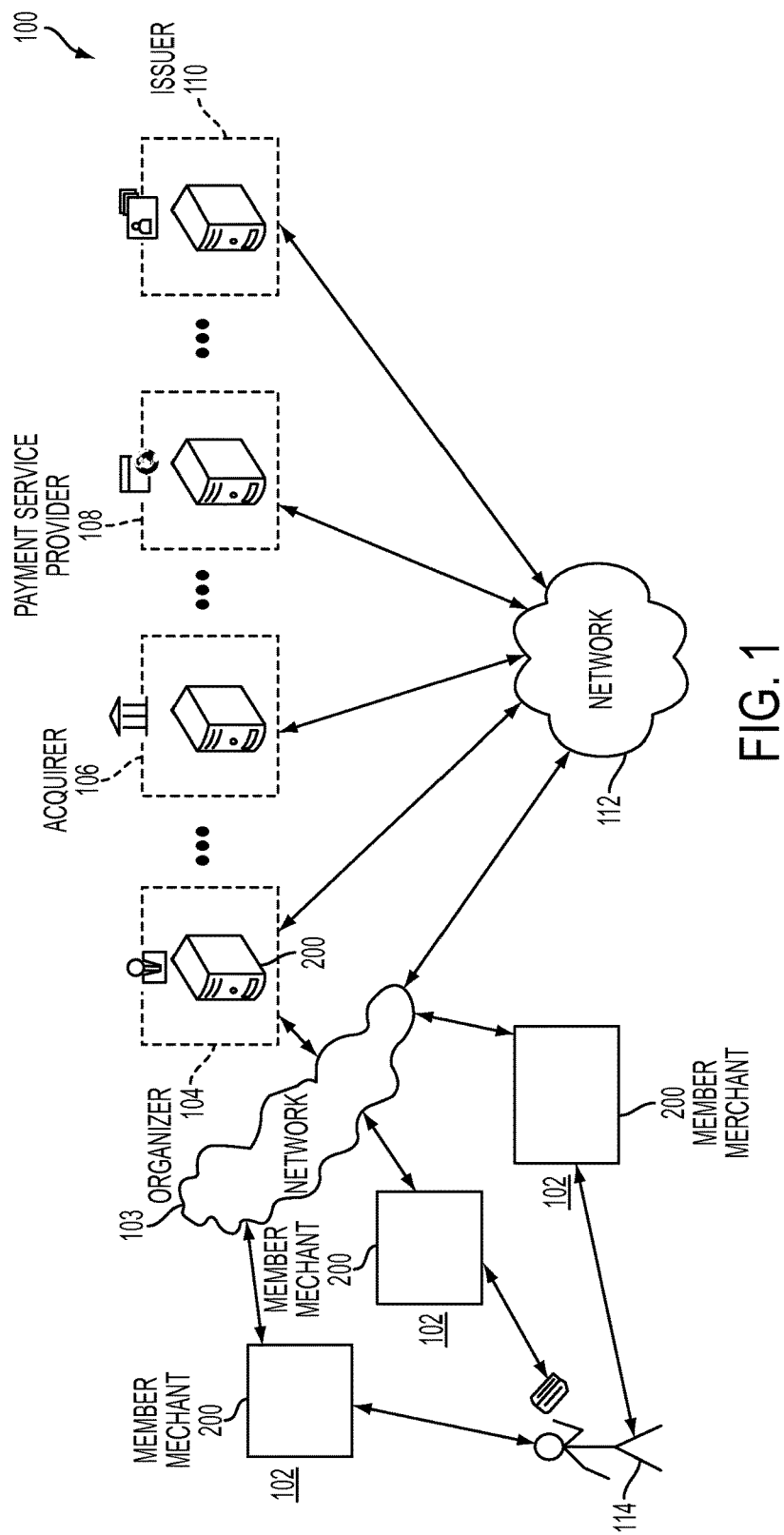
FIG. 1 is a block diagram of an exemplary system of the present disclosure suitable for use in aggregating consumer-specific transactions with member merchants associated with a social venture.

FIG. 1 illustrates an exemplary system 100, in which the one or more aspects of the present disclosure may be implemented. Although, in the described embodiment, parties/components of the system 100 are presented in one arrangement, other embodiments may include the same or different components arranged otherwise, depending, for example, on authorization processes for payment account transactions.

Referring to FIG. 1, the system 100 includes multiple member merchants 102 and an organizer 104, associated with a social venture. The social venture may be any gathering of people, where one or more separate merchants may offer goods and/or services for purchase to the consumers 114. Exemplary social ventures include, without limitations, festivals, farmers markets, sports events, school activities, carnivals, etc. While three member merchants 102 are illustrated, it should be appreciated that the number of member merchants 102 may be different, depending, for example, on the type and/or size of the social venture. The organizer 104 includes, for example, an entity in charge of the social venture, or a person responsible for some aspect of the social venture, etc. As shown in the system 100, each of the member merchants 102 and the organizer 104 is associated with a computing device 200, described below. The merchant computing device 200 may be supplied to the member merchants 102 by the organizer 104, or in other embodiments, the merchant computing device may be the property of the member merchant 102 (e.g., a smartphone, etc.). In at least one embodiment, the organizer 104 provides a portion of the member merchant computing device 200, such as, for example, a card reader input device 208, for use with a computing device owned by the member merchant 102 (e.g., a smartphone, etc.)

Each of the merchant computing devices 200 is coupled to the organizer computing device 200, via a network 103. The network 103 may include, without limitation, a local area network (LAN), mobile network, or a different type of network suitable to permit communication between the merchant computing devices 200 and the organizer computing device 200.

The illustrated system 100 also includes an acquirer 106, a payment service provider 108, and an issuer 110, each of which is implemented as one or more computing devices 200 located together, or distributed across a geographic region. Each is coupled to network 112. The network 112 may include, without limitation, a local area network (LAN), a wide area network (WAN) (e.g., the Internet, etc.), a mobile network, and/or another suitable public and/or private network capable of supporting communication among two or more of the components illustrated in FIG. 1, or any combinations thereof. In one example, network 112 includes multiple different networks, such as a private payment network made accessible by the payment service provider 108 (e.g., between the acquirer 106, the payment service provider 108, and the issuer 110) and a public Internet (e.g., between the organizer 104 and the acquirer 106). In at least one embodiment, the network 103 is the same as, or part of, the network 112.

Figure 2:
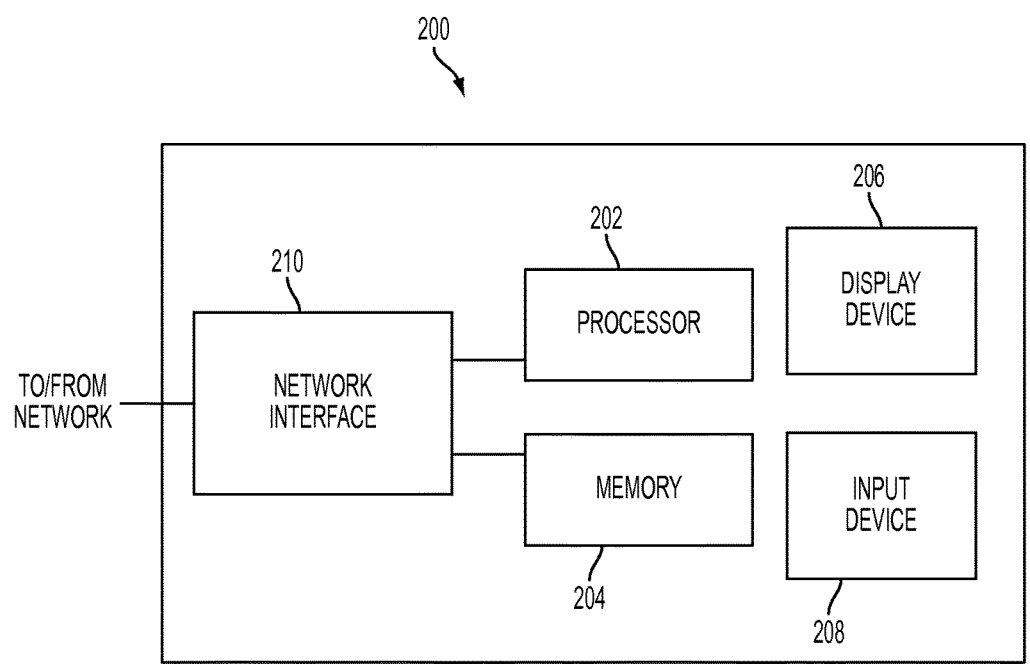
FIG. 2 is a block diagram of a computing device that may be used in the exemplary system of FIG. 1.

For illustration, the system 100 is further described below with reference to an exemplary computing device 200 illustrated in FIG. 2. The system 100 and the components/parties therein, however, should not be considered to be limited to the computing device 200, as different computing devices and/or arrangements of computing devices may be used in other embodiments.

The computing device 200 may include, for example, one or more servers, workstations, personal computers, laptops, tablets, PDAs, card reader devices, smartphones, etc.

The exemplary computing device 200 includes a processor 202 and a memory 204 that is coupled to the processor 202. The processor 202 may include one or more processing units (e.g., in a multi-core configuration, etc.). The processor 202 may include, but is not limited to, a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and thus are not intended to limit in any way the definition and/or meaning of processor. The memory 204, as described herein, is one or more devices that enable information, such as computer-executable instructions and/or other data, to be stored and retrieved. The memory 204 may include one or more computer-readable media, such as, without limitation, dynamic random access memory (DRAM), static random access memory (SRAM), read only memory (ROM), solid state devices, and/or hard disks. The memory 204 may be configured to store a variety of different data including, without limitation, organizer identifier(s), ledgers of payment account transactions, member merchant accounts, and/or other suitable information for use as described herein, etc.

In the exemplary embodiment, computing device 200 includes a display device 206 that is coupled to the processor 202. Display device 206 outputs to a user by, for example, displaying and/or otherwise outputting information such as, but not limited to, pages, applications, options for shipping products, status of product shipments, payment account transactions, and/or any other type of data. For example, display device 206 may include, without limitation, a cathode ray tube (CRT), a liquid crystal display (LCD), a light-emitting diode (LED) display, an organic LED (OLED) display, and/or an "electronic ink" display. In some embodiments, display device 206 includes multiple devices. It should be further appreciated that various interfaces (e.g., graphic user interfaces (GUI), or webpages, etc.) may be displayed at computing device 200, and in particular at display device 206, to initiate, solicit, and/or complete payment account transactions, etc.

The computing device 200 also includes an input device 208 that receives input from the user, such as the member merchant 102 or individuals associated with the organizer 104, for example. The input device 208 is coupled to the processor 202 and may include, for example, a keyboard, a pointing device, a mouse, a stylus, a touch sensitive panel (e.g., a touch pad or a touch screen, etc.), and/or an audio input device. In some example embodiments, the input device 208 may include a card reader, swipe reader, etc., and/or any other device suitable for obtaining payment account information from a payment device. Further, in various exemplary embodiments, a touch screen, such as that included in a tablet, a smartphone, or similar device, behaves as both display device 206 and input device 208.

The computing device 200 further includes a network interface 210 coupled to the processor 202. The network interface 210 may include, without limitation, a wired network adapter, a wireless network adapter, a mobile telecommunications adapter, or other device capable of communicating to one or more different networks, including networks 103 and/or 112.

Figure 3:
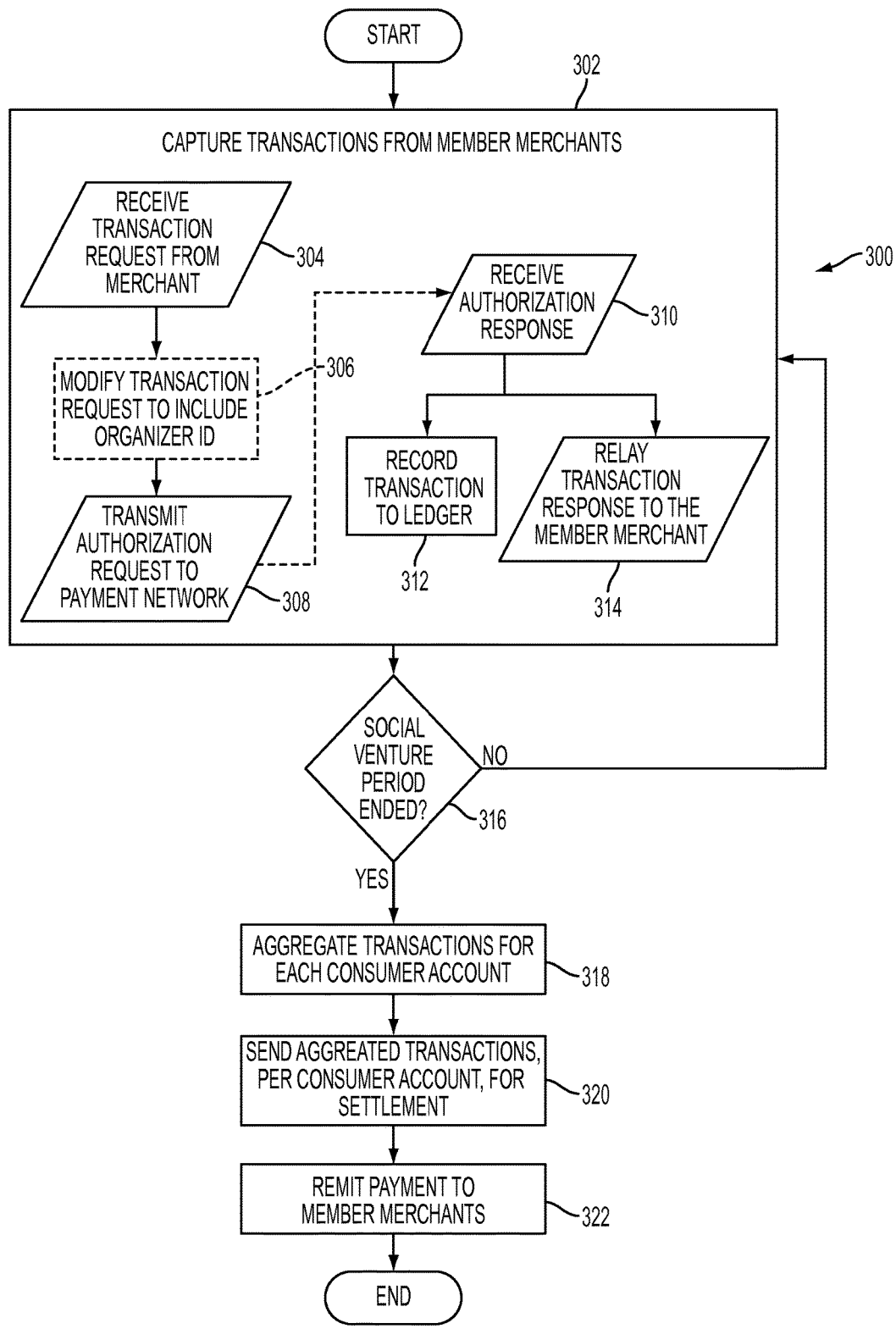
FIG. 3 is an exemplary method for aggregating consumer-specific transactions made to member merchants associated with a social venture.

FIG. 3 illustrates an exemplary method 300 of aggregating consumer-specific transactions made to member merchants associated with a social venture. The exemplary method 300 is described as implemented in the organizer 104, and in particular, the organizer computing device 200. It should be appreciated that the methods described herein are not limited to the system 100, or computing device 200. And, conversely, the systems and computing devices described herein are not limited to the exemplary method 300.

In the exemplary embodiment, method 300 is directed to a social venture, which includes multiple member merchants. Often before the start of the social venture, the organizer 104 determines a social venture period, during which it will accept transactions from the member merchants. The social venture period may include, for example, the duration of the social venture event (e.g., from noon to 8:00 pm for a festival, etc.), 5 hours, a business day, a half day, or another duration related to the social venture. The social venture period may be determined to be a single time period, or it may be periodic over multiple days, weeks, months, etc. In at least one embodiment, where the organizer 104 supplies merchant computing devices 200 to the member merchants 102, the social venture period includes the time the member merchant 102 is in possession of the merchant computing devices 200. For example, member merchants 102 may be permitted to checkout merchant computing devices 200 starting at 8:00 am, but are required to return them before 2:00 pm, where a farmer's market is scheduled to begin at 9:00 am and conclude at 1:00 pm. In such an example, the social network period extends from when each member merchant 102 checks out the merchant computing device 200, and ends, when it is returned to the organizer 104.

With continued reference to FIG. 3, at the start of the social venture, or some time relative thereto, the social venture period begins. For the duration of the social venture period, the organizer 104 (particularly, the organizer computing device 200) captures, at 302, transactions from the member merchants 102. In particular, when a consumer 114 wishes to complete a transaction with a payment account, the consumer 114 presents a payment device associated with the payment account (or a consumer account). In turn, the member merchant swipes, or otherwise reads, the payment device at merchant computing device 200, and in particular, the input device 208. The merchant computing device 200 then sends transaction request data to the organizer 104. At 304, the organizer 104 receives the transaction request data from a member merchant 102. The transaction request data includes information related to the attempted transaction between the consumer 114 and the member merchant 102. The amount of information included in the transaction request data may range from including only basic information (e.g., a consumer account number, an amount of the transaction, an aggregation indictor, and a member merchant identifier) to full authorization request data for a consumer account (e.g., ISO 0100 or 0200 messages, etc.).

If the transaction request data includes full authorization request data, the organizer 104 may transmit the transaction request, as-is, as the authorization request. Conversely, where the transaction request data includes less than complete or full authorization request data, the organizer 104 may modify the transaction request to generate the authorization request data. For example, as shown in FIG. 3, the organizer 104 may optionally (as indicated by the dotted lines) modify the transaction request data, at 306, to include an organizer identifier. The organizer identifier is indicative of an organizer account, to which transactions from the member merchants 102 are to be posted. In another example, the organizer 104 may further include an aggregation indicator in the authorization request data, indicating the transaction to be completed is associated with an organizer 104 of a social venture, rather than a traditional merchant. For example, a field of the authorization request data (e.g., an ISO 0100 message, etc.), may include a special digit, or code indicative of the social venture. The aggregation indicator may be used as described below. Other modifications may or may not be made to the transaction request data by the organizer, in other embodiments, to generate an authentication request data therefrom, which is suitable to be transmitted to the payment network. Further, the amount included in the authorization request data sent by the organizer 104 may be different than the amount of the purchase. For example, a purchase of $35.45 during the social venture may cause the organizer 104 to send an authorization request for $100, which would cause a hold to be placed on $100 of credit/funds. In this manner, the organizer 104 may avoid sending multiple requests for subsequent purchases (under the $100 limit, for example), at the social venture.

Referring again to FIG. 3, the organizer 104 then transmits the authorization request data to a payment network at 308. In particular, the organizer 104 transmits the authorization request data to the acquirer 106, shown in FIG. 1. The acquirer 106, in turn, communicates with the issuer 110 through a payment service provider 108, such as, for example, a payment system using the MasterCard® interchange, for authorization to complete the transaction. If the issuer 110 accepts the transaction, authorization response data indicating approval is provided back through the payment network to the organizer 104. Further, the issuer 110 (or the payment service provider 108) may detect or recognize the aggregation indicator in the authorization request data and flag the authorization request data as associated with a social venture (for purposes of settlement, as described below). On the other hand, if the issuer 110 rejects the transaction, authorization response data indicating the decline is provided back through the payment network to the organizer 104. Additionally, the issuer 110, recognizing the social venture by the aggregation indicator or the organizer's account number, may issue an authorization for an amount greater than the purchase amount included in the authorization request data, and further place a hold to be placed on $100 of credit/funds. The authorization response, from the issuer 110, would indicated the greater authorization amount, thereby permitting the organizer 104 to complete additional transactions during the social venture up to the authorized amount.

The organizer 104 receives the authorization response data, at 310. If the transaction is approved, the organizer 104 records the transaction to a ledger at 312, which is stored in memory 204. The organizer 104 may further store information about each transaction (e.g., member merchant identifier, consumer payment account, payment amount, etc.) to the ledger data structure in the memory 204. Thus, the ledger data structure may include information about all authorization request data received from all member merchants, for all transactions (by consumer payment account) during the social venture. Additionally, when the transaction is declined, the organizer 104 may store the authorization request data, authorization response data (including authorization codes or numbers, etc.), and/or other data associated with the attempted transaction (e.g., amount of the attempted transaction, member merchant identifier, date/time, consumer payment account, etc.). In at least one embodiment, the organizer 104 forgoes storing any information about declined transactions.

The organizer 104 further relays transaction response data to the member merchant 102 who initiated the transaction request, at 314. The organizer 104 relies on a merchant identifier in the authorization response to determine which, of the multiple member merchants, the transaction response should be relayed to. The relayed transaction request data indicates the authorization status data to the member merchant 102, at the merchant computing device 200. In one example, the merchant computing device 200 will display, at display device 206, "approved," "declined," or other words or symbols indicative of the approval/decline of the transaction to the consumer's account. In response, the member merchant 102 generally either completes the transaction, or halts the transaction pending another form of payment.

The above is repeated for each attempted transaction to any of the member merchants 102 associated with the social venture. As more and more transactions are completed, the ledger data structure, stored in memory 204, continues to be populated with the data described above. In one example, a consumer, John Smith, completes a purchase for $8.00 with one of the member merchants 102, and then completes an $11.30 purchase with another one of the member merchants 102, and further completes a $7.50 transaction with a third member merchant 102. Each transaction is completed using a payment account, and as such, an authorization request was sent, and an authorization response was received for each of the transactions (or only for an initial transaction in some embodiments). And, the ledger data structure includes an entry for each transaction. Transactions are continually added to the ledger data structure, until the social venture period is ended, at 316. After which, the organizer 104 may decline payment account transactions (even without interaction with the payment network), and cause a decline to be displayed at each of the merchant computing devices 200, such as, for example, a social venture period set to begin the next day. Alternatively, in at least one embodiment, the organizer 104 will append transactions after the social venture period to a next ledger data structure associated with a next social venture period. Additionally, the organizer 104 may aggregate and attempt to settle transactions multiple times during a single event, although this may lead to diminished savings of reduced fees. In this case, each aggregation and settlement may be considered an end of the current social venture period, such that transactions occurring after the current aggregation and settlement will be added to the next social venture period.

As shown in FIG. 3, when the social venture period is ended, at 316, the organizer (and in particular, the organizer computing device 200) aggregates transactions for each consumer account at 318. Accordingly, after the aggregation, only one aggregated transaction will exist for each consumer account used to make a purchase at any of the member merchants 102 during the social venture. With reference to the Smith example above, the organizer 104 aggregates the $8.00 transaction, $11.30 transaction, and the $7.50 transaction into a single transaction, i.e., a $26.80 transaction. While method 300 includes aggregating the transactions, per consumer account, after the social venture period, it should be appreciated that the organizer 104 may aggregate the transaction, as each transaction is completed and/or added to the ledger data structure. In at least one example, the transactions are aggregated periodically, during the social venture period.

Once the social venture period has ended, at 316, and the transactions are aggregated at 318, the organizer 104 sends the transaction to the acquirer 106, to be settled with the issuer 110, at 320. By sending a single transaction for each consumer account, rather than multiple transactions for a consumer account, the organizer 104 reduces the number of transactions to be settled, and consequently, the fees assessed by the issuer 110, the payment service provider 108, and/or the acquirer 106 to process the payment account transactions. In this manner, the organizer 104 reduces the cost associated with accepting payment accounts as a form of payment at social ventures. Additionally, if the fees are based on a percentage of the volume of the transaction (instead of fixed fees per transaction), the percentage may be further reduced for social venture organizers (as compared to traditional merchants) to reduce the cost of accepting payment account transactions at social ventures.

As part of the settlement of the transactions, the payment service provider 108 and/or the issuer 110 notes different authorization requests, which were flagged as having an aggregation indicator. With further reference to the Smith example, the issuer 110 may have received three separate authorization requests (i.e., the $8.00 transaction, $11.30 transaction, and the $7.50 transaction) and consistent with typical payment network operation, expects three separate transactions to be settled. Because the authorization request data is flagged with an aggregation indicator, or are now flagged at settlement, the issuer 110 understands that multiple transactions to the organizer 104 may be aggregated to a single transaction, having a value of $26.80. It may then search for multiple authorization requests for an amount equal to the settlement, and settle all three authorizations with the one transaction (and one fixed fee associated with the transaction).

In addition to reconciliation of the authorization requests and transactions for settlement, the issuer 110 may offer further discounts or reduction in fees, where the social venture is of a particular type. For example, where the social venture relates to a charity, or furthers a goal of an issuer (e.g., farmer's markets may further the goal of locally grown produce, etc.), the issuer may reduce the fee charged during settlement of the transaction. These fees may be reduced by 10%, 20%, 30% or more, or less, depending on, for example, the particular type of social venture. Further, as demonstrated above, where fixed fees are associated with each authorization and/or each transaction, the reduced number of authorizations and/or transactions will result in reductions in the amount of fees paid by the organizer 104 and social member merchant 102.

With further reference to FIG. 3, after the transactions are settled, the organizer 104 remits payment to the member merchants at 322. In this embodiment, the organizer computing device 200 remits payment to each member merchant, for all transactions listed within the ledger data structure for the member merchant 102. The remitted payment may include a total of all transaction amounts to the member merchant 102, less a fee in some examples. The fee may be a percentage of the total transaction amount, a flat fee or based on the number of transactions, etc. While transactions may generally be settled the day after the social venture, in some embodiments, transactions may be settled on the same day as the social venture, or more than one or two days after the social venture, thereby potentially delaying remittance to the member merchants 102.

The embodiments herein thus permit member merchants associated with a social venture to accept payment account transactions, while reducing the associated fees by settling only one transaction per consumer. This may provide cost savings, reduce payment network traffic, improve ease of payment account transaction acceptance for member merchants 102 of social ventures, without requiring them to set up their own payment acceptance models, etc. Accordingly, the organizer 104 may implement the systems and/or methods described herein as a perk to member merchants 102 for participation in the social venture.

It should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) capturing and storing multiple transactions during a social venture period, each transaction completed with member merchants of a social venture, (b) when the multiple transactions include at least two transactions involving a single consumer account, aggregating the at least two transactions into a single transaction, (c) after the social venture period, submitting the single transaction for the single consumer account to a payment network for settlement, and (d) remitting payment to each member merchant for transactions to the member merchant completed within the social venture period.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for aggregating consumer-specific transactions made with a plurality of member merchants associated with an organizer of a social venture, the plurality of member merchants including at least a first member merchant associated with a first member merchant identifier and a second member merchant associated with a second member merchant identifier, the system comprising:
   an organizer computing device including a memory and a processor coupled to the memory, the memory having a ledger data structure and computer-executable instructions that, when executed by the processor, cause the processor to:
      for a first transaction between the first member merchant and one consumer of a plurality of consumers within a social venture period of the social venture:
         receive transaction request data for the first transaction from a first member merchant computing device coupled to the organizer computing device and associated with the first member merchant during the social venture period to complete the first transaction to an account associated with the one consumer;
         based on the transaction request data for the first transaction, transmit authorization request data for the first transaction to a payment service provider via an acquirer associated with the organizer, the authorization request data for the first transaction including the first member merchant identifier, an organizer identifier, and an aggregation indicator, thereby permitting at least one of an issuer of the account and the payment service provider to identify the first transaction as associated with the social venture; and
         record the first transaction to the ledger data structure, in the memory, when authorization response data for the first transaction received from the issuer, in response to the authorization request data for the first transaction, indicates the first transaction is approved;
      for a second transaction between the second member merchant and the one consumer within the social venture period:
         receive transaction request data for the second transaction from a second member merchant computing device coupled to the organizer computing device and associated with the second member merchant during the social venture period to complete the second transaction to the account associated with the one consumer;
         based on the transaction request data for the second transaction, transmit authorization request data for the second transaction to the payment service provider via the acquirer associated with the organizer, the authorization request data for the second transaction including the second member merchant identifier, the organizer identifier, and the aggregation indicator, thereby permitting the at least one of the issuer of the account and the payment service provider to identify the secondtransaction as associated with the social venture; and
         record the second transaction to the ledger data structure, in the memory, when authorization response data for the second transaction received from the issuer, in response to the authorization request data for the second transaction, indicates the second transaction is approved;
      aggregate the first and second transactions of the one consumer recorded to the ledger data structure into one aggregated transaction and, after the social venture period, submit the one aggregated transaction to the payment service provider, via the acquirer associated with the organizer, for settling, thereby reducing payment network traffic associated with processing the first and second transactions; and
      remit payment to each of the first member merchant and the second member merchant.

2. The system of claim 1, wherein the social venture period is one of: less than a business day and a duration of a social venture event.

3. The system of claim 1, wherein the computer-executable instructions, when executed by the processor, further cause the processor to:
   transmit transaction response data for the first transaction to the first member merchant computing device, the transaction response data for the first transaction indicating the first transaction is approved or declined.

4. The system of claim 3, wherein the transaction response data for the first transaction includes the authorization response data for the first transaction.

5. The system of claim 1, further comprising multiple member merchant computing devices including at least the first member merchant computing device and the second member merchant computing device; and
 wherein the first member merchant computing device is configured to transmit the transaction request data for the first transaction to the organizer computing device; and
 wherein the second member merchant computing device is configured to transmit the transaction request data for the second transaction to the organizer computing device; and
 wherein the transaction request data for the first transaction includes the first member merchant identifier and the transaction request data for the second transaction includes the second member merchant identifier.

6. The system of claim 5, wherein each of the multiple member merchant computing devices is configured to accept a swipe of a payment device for the account associated with the one consumer.

7. The system of claim 1, wherein the remitted payment to the first member merchant is an amount of the first transaction during the social venture period less a first fee; and
 wherein the remitted payment to the second member merchant is an amount of the second transaction during the social venture period less a second fee.

8. A method for aggregating consumer-specific transactions made with a plurality of social venture member merchants through an organizer associated with a social venture, the method comprising:
 distributing a plurality of member merchant computing devices including at least a first member merchant computing device associated with a first member merchant of the plurality of member merchants and a second member merchant computing device associated with a second member merchant of the plurality of member merchants;
 receiving, by an organizer computing device associated with the plurality of member merchant computing devices during a social venture period related to the social venture, transaction request data for a first transaction from the first member merchant computing device to complete the first transaction to an account associated with one consumer;
 based on the transaction request data for the first transaction, transmitting, by the organizer computing device, authorization request data for the first transaction to a payment service provider via an acquirer associated with the organizer, the authorization request data for the first transaction including a first member merchant identifier of the first member merchant, an organizer identifier, and an aggregation indicator, thereby permitting at least one of an issuer of the account and the payment service provider to identify the first transaction as associated with the social venture;
 recording, by the organizer computing device, the first transaction to a ledger data structure when authorization response data for the first transaction received from the issuer, in response to the authorization request data for the first transaction, indicates the first transaction is approved;
 receiving, by the organizer computing device, transaction request data for a second transaction from the second member merchant computing device to complete the second transaction to the account associated with the one consumer;
 based on the transaction request data for the second transaction, transmitting, by the organizer computing device, authorization request data for the second transaction to the payment service provider via the acquirer associated with the organizer, the authorization request data for the second transaction including a second member merchant identifier of the second member merchant, the organizer identifier, and the aggregation indicator, thereby permitting at least one of the issuer of the account and the payment service provider to identify the second transaction as associated with the social venture;
 recording, by the organizer computing device, the second transaction to the ledger data structure when authorization response data for the second transaction received from the issuer, in response to the authorization request data for the second transaction, indicates the second transaction is approved;
 aggregating, by the organizer computing device, the first and second transactions recorded to the ledger data structure into one aggregated transaction, and, after the social venture period, submitting the one aggregated transaction to the payment service provider, via the acquirer, for settling, thereby reducing network traffic associated with processing the first and second transactions; and
 remitting payment to each of the first member merchant and the second member merchant.

9. The method of claim 8, wherein the social venture period is a duration of a social venture event.

10. The method of claim 8, further comprising transmitting, by the organizer computing device, transaction response data for the first transaction to the first member merchant computing device, the transaction response data indicating the first transaction is approved or declined.

11. The method of claim 10, wherein the transaction response data for the first transaction includes the authorization response data for the first transaction.

12. The method of claim 8, wherein the remitted payment to the first member merchant is an amount of the first transaction less a first fee; and
 wherein the remitted payment to the second member merchant is an amount of the second transaction less a second fee.

13. A non-transitory computer readable storage media comprising instructions executable by a processor of an organizer computing device associated with an organizer of a social venture having a social venture period, that, when executed by the processor, cause the processor to:
 receive transaction request data for a first transaction from a first member merchant computing device coupled to the organizer computing device and associated with the first member merchant to complete the first transaction to an account associated with one consumer;
 based on the transaction request data for the first transaction, transmit authorization request data for the first transaction to a payment service provider via an acquirer associated with the organizer, the authorization request data for the first transaction including a first member merchant identifier, an organizer identifier, and an aggregation indicator, thereby permitting at least one of an issuer of the account and the payment service provider to identify the first transaction as associated with the social venture;

record the first transaction to a ledger data structure when authorization response data for the first transaction received from the issuer, in response to the authorization request data for the first transaction, indicates the first transaction is approved;

receive transaction request data for a second transaction from a second member merchant computing device coupled to the organizer computing device and associated with the second member merchant to complete the second transaction to the account associated with the one consumer;

transmit authorization request data for the second transaction to the payment service provider via the acquirer associated with the organizer, the authorization request data for the second transaction including a second member merchant identifier, the organizer identifier, and the aggregation indicator, thereby permitting at least one of the issuer of the account and the payment service provider to identify the second transaction as associated with the social venture;

record the second transaction to the ledger data structure when authorization response data for the second transaction received from the issuer, in response to the authorization request data for the second transaction, indicates the second transaction is approved;

aggregate the first and second transactions of the one consumer recorded to the ledger data structure into one aggregated transaction, and, after the social venture period, submit the one aggregated transaction to the payment service provider, via the acquirer, for settling, thereby reducing network traffic associated with processing the first and second transactions; and remit payment to each of the first member merchant and the second member merchant.

14. The non-transitory computer readable storage media of claim 13, wherein the aggregation indicator indicates, to the at least one of the payment service provider and the issuer, that the transaction to be completed is associated with the organizer of the social venture, rather than a traditional merchant.

15. The non-transitory computer readable storage media of claim 13, wherein the instructions, when executed by the processor, cause the processor to:

transmit transaction response data for the first transaction, based on the authorization response data for the first transaction, to the first member merchant at the first member merchant computing device; and transmit transaction response data for the second transaction, based on the authorization response data for the second transaction, to the second member merchant at the second member merchant computing device.

16. The non-transitory computer readable storage media of claim 13, wherein the social venture period is a duration of a social event.

17. The non-transitory computer readable storage media of claim 13, wherein the social venture period is less than one business day.

* * * * *